(12) United States Patent
Su et al.

(10) Patent No.: US 11,797,108 B1
(45) Date of Patent: Oct. 24, 2023

(54) MOUSE DEVICE

(71) Applicant: Primax Electronics Ltd., Taipei (TW)

(72) Inventors: Chun-Nan Su, Taipei (TW); Chun-Che Wu, Taipei (TW); Shu-An Huang, Taipei (TW); Chun-Lin Chu, Taipei (TW); Ming-Hao Hsieh, Taipei (TW); Sheng-An Tsai, Taipei (TW); Li-Kuei Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/105,121

(22) Filed: Feb. 2, 2023

(30) Foreign Application Priority Data

Nov. 11, 2022 (TW) .................................. 111143295

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
CPC ............................ G06F 3/03543; G06F 3/0362
See application file for complete search history.

(56) References Cited

U.S. PATENT DOCUMENTS

| | | | |
|---|---|---|---|
| 11,048,344 B1* | 6/2021 | Drezet | H01F 7/20 |
| 11,099,667 B1* | 8/2021 | Cheng | G06F 3/0362 |
| 11,175,752 B1* | 11/2021 | Chu | G06F 3/0362 |
| 11,681,379 B1* | 6/2023 | Su | G06F 3/03543 |
| | | | 345/163 |
| 2004/0119693 A1* | 6/2004 | Kaemmler | G06F 1/266 |
| | | | 345/163 |
| 2007/0146324 A1* | 6/2007 | Blandin | G06F 3/0362 |
| | | | 345/163 |
| 2007/0188453 A1* | 8/2007 | O'Sullivan | G06F 3/03543 |
| | | | 345/163 |
| 2011/0227828 A1* | 9/2011 | Blandin | G06F 3/03543 |
| | | | 345/163 |
| 2020/0004352 A1* | 1/2020 | McLoughlin | G06F 3/0383 |
| 2021/0004091 A1* | 1/2021 | Rizvi | G06F 3/03543 |
| 2022/0300095 A1* | 9/2022 | Cheng | G06F 3/0354 |
| 2023/0087434 A1* | 3/2023 | Battlogg | G06F 3/016 |

* cited by examiner

*Primary Examiner* — Ariel A Balaoing
(74) *Attorney, Agent, or Firm* — KIRTON McCONKIE; Evan R. Witt

(57) ABSTRACT

A mouse device includes a roller module. The roller module includes a base member, a scroll wheel, a magnetic conductor, a swingable arm, a driving motor and an actuating element. The scroll wheel is installed on the base member. The magnetic conductor is located beside the scroll wheel. When the scroll wheel is rotated, the magnetic conductor is correspondingly rotated. The swingable arm is installed on the base member. The swingable arm includes a magnetic element. The swingable arm is swingable relative to the magnetic conductor. When the swingable arm is swung to a first position, the magnetic element is aligned with the magnetic conductor. Consequently, a magnetic attraction force between the magnetic element and the magnetic conductor is generated. When the swingable arm is swung to a second position, the magnetic attraction force between the magnetic element and the magnetic conductor is eliminated.

10 Claims, 8 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-button mouse device is gradually evolved into the modern wireless multi-button roller mouse device. For complying with different industrial needs or personal preferences, various electronic manufacturers have begun to create a variety of mouse device devices with different shapes in order to meet the operation requirements of different users. Consequently, people pay much attention to the comfort and sensitivity of pressing or operating the mouse button (e.g., the left button, the right button or the middle button).

According to the existing design, the roller of the mouse can be rotated forwardly or backwardly to control the movement of the vertical scroll bar in a window operation interface, and the roller of the mouse can be pressed to trigger a switch. However, the conventional mouse roller is only able to provide a single scrolling feel (e.g., a stepless scrolling feel or a lag scrolling feel). That is, the scrolling feel cannot be adjusted by the user. If the user needs a roller with the different scrolling feel, the user has to purchase a new mouse. Since the cost of purchasing the additional mouse is high, the use flexibility and the operating convenience of the mouse are limited. Moreover, if the mouse is not suitable, the working efficiency is deteriorated.

Therefore, there is a need of providing an improved mouse device in order to overcome the drawbacks of the conventional technologies.

SUMMARY OF THE INVENTION

An object of the present invention provides a mouse device. A roller module of the mouse device can be switched between various operating modes. Consequently, the operating convenience is effectively enhanced.

The other objects and advantages of the present invention will be understood from the disclosed technical features.

In accordance with an aspect of the present invention, a mouse device is provided. The mouse device includes a roller module. The roller module includes a base member, a scroll wheel, a magnetic conductor, a swingable arm, a driving motor and an actuating element. The scroll wheel is installed on the base member. The magnetic conductor is located beside the scroll wheel. When the scroll wheel is rotated, the magnetic conductor is correspondingly rotated. The swingable arm is installed on the base member. The swingable arm includes a magnetic element. The swingable arm is swingable relative to the magnetic conductor. When the swingable arm is swung to a first position, the magnetic element is aligned with the magnetic conductor. Consequently, a magnetic attraction force between the magnetic element and the magnetic conductor is generated. The driving motor is installed on the base member. The actuating element arranged between the driving motor and the swingable arm. The actuating element has a curvy surface. While the driving motor drives the actuating element to rotate in a first direction, the curvy surface of the actuating element is contacted with the swingable arm. Consequently, the swingable arm is moved along the curvy surface of the actuating element and swung from a first position to a second position. When the swingable arm is swung to the second position, the magnetic attraction force between the magnetic element and the magnetic conductor is eliminated.

In an embodiment, while the driving motor drives the actuating element to rotate in a second direction opposite to the first direction, the swingable arm is moved along the curvy surface of the actuating element and swung from the second position to the first position. When the swingable arm is swung to the first position, the swingable arm is detached from the curvy surface of the actuating element.

In an embodiment, the roller module further includes a noise reduction element, and the base member further includes a first protrusion stopper and a second protrusion stopper. The noise reduction element is connected with the actuating element. The first protrusion stopper and the second protrusion stopper are opposed to each other. The first protrusion stopper and the second protrusion stopper are arranged between the driving motor and the actuating element. While the driving motor drives the actuating element to rotate in the first direction, the noise reduction element is correspondingly rotated, and the noise reduction element is contacted with the first protrusion stopper. Consequently, the actuating element is positioned at the first position. While the driving motor drives the actuating element to rotate in the second direction, the noise reduction element is correspondingly rotated, and the noise reduction element is contacted with the second protrusion stopper. Consequently, the actuating element is positioned at the second position.

In an embodiment, the scroll wheel includes a fixed shaft, and the driving motor includes a driving shaft. The scroll wheel is pivotally coupled to the base member through the fixed shaft. The magnetic conductor is sheathed around the fixed shaft and located beside the scroll wheel. The actuating element is sheathed around the driving shaft of the driving motor. An extending direction of the fixed shaft and an extending direction of the driving shaft are in parallel with each other.

In an embodiment, the swingable arm includes a swinging part, a push part and a pivotal part. The magnetic element is installed in or installed on the swinging part. When the swingable arm is swung to the first position, the swinging part is aligned with the magnetic conductor, and the magnetic element is arranged between the swinging part and the magnetic conductor. While the driving motor drives the actuating element to rotate in the first direction, the curvy surface of the actuating element is contacted with the push part. The pivotal part is connected between the swinging part and the push part. The swingable arm is pivotally coupled to the base member through the pivotal part.

In an embodiment, the base member includes a bearing. The bearing is arranged between the magnetic conductor and the actuating element. The swingable arm is pivotally coupled to the bearing through the pivotal part.

In an embodiment, the roller module further includes a bearing sleeve. The bearing sleeve is sheathed around the bearing of the base member. The bearing sleeve is arranged between the bearing and the pivotal part of the swingable arm.

In an embodiment, the roller module further includes an elastic element. A first end of the elastic element is contacted with the swingable arm. A second end of the elastic element is contacted with the base member.

In an embodiment, the magnetic conductor is a gear.

In an embodiment, the mouse device further includes a casing. The casing has a perforation. The roller module is installed within the casing. A portion of the roller module is exposed outside the casing through the perforation.

From the above descriptions, the present invention provides the mouse device. In the roller module, the driving motor drives the rotation of the actuating element. While the actuating element is rotated, the curvy surface of the actuating element is contacted with the swingable arm. Consequently, the swingable arm is moved along the curvy surface of the actuating element, and the swingable arm is swung to a selected position relative to the magnetic conductor. According to the relative position between the swingable arm and the magnetic conductor, a magnetic attraction force between the magnetic element and the magnetic conductor can be generated or eliminated. Consequently, the operating mode of the roller module can be switched between the stepped motion mode and the hyper-fast scrolling mode. Due to this structural design, the magnetic element can be moved to a first position where the magnetic conductor is within the sensing range of the magnetic element or moved to a second position where the magnetic conductor is completely departed from the sensing range of the magnetic element. Consequently, the user can clear sense the operating feel corresponding to the stepped motion mode or the hyper-fast scrolling mode. Due to the arrangement of the noise reduction element and the bearing sleeve, the process of switching the operating mode of the roller module can be smoothly done while reducing the noise.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
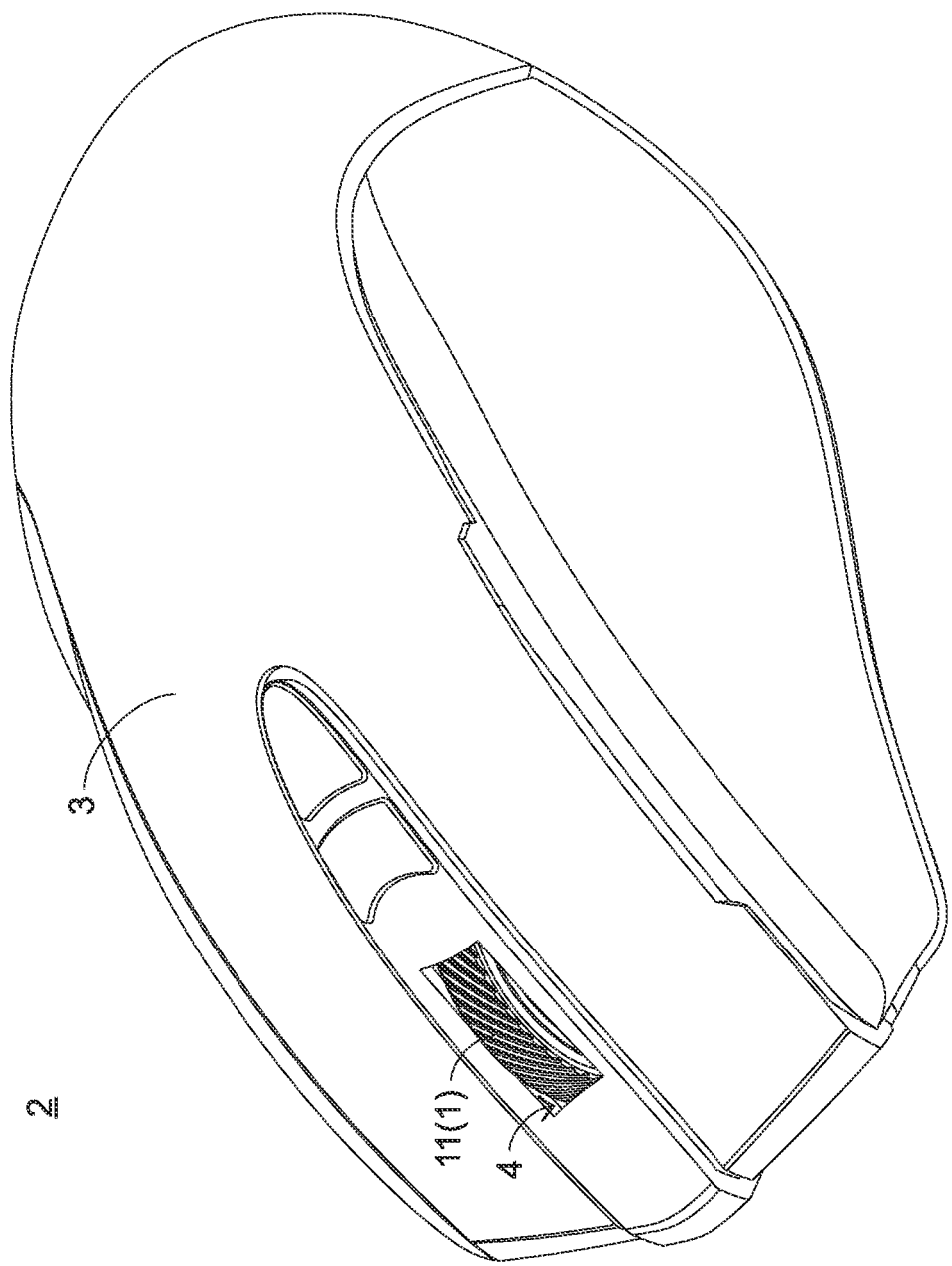
FIG. 1 is a schematic perspective view illustrating the appearance of a mouse device according to an embodiment of the present invention.
Figure 2:
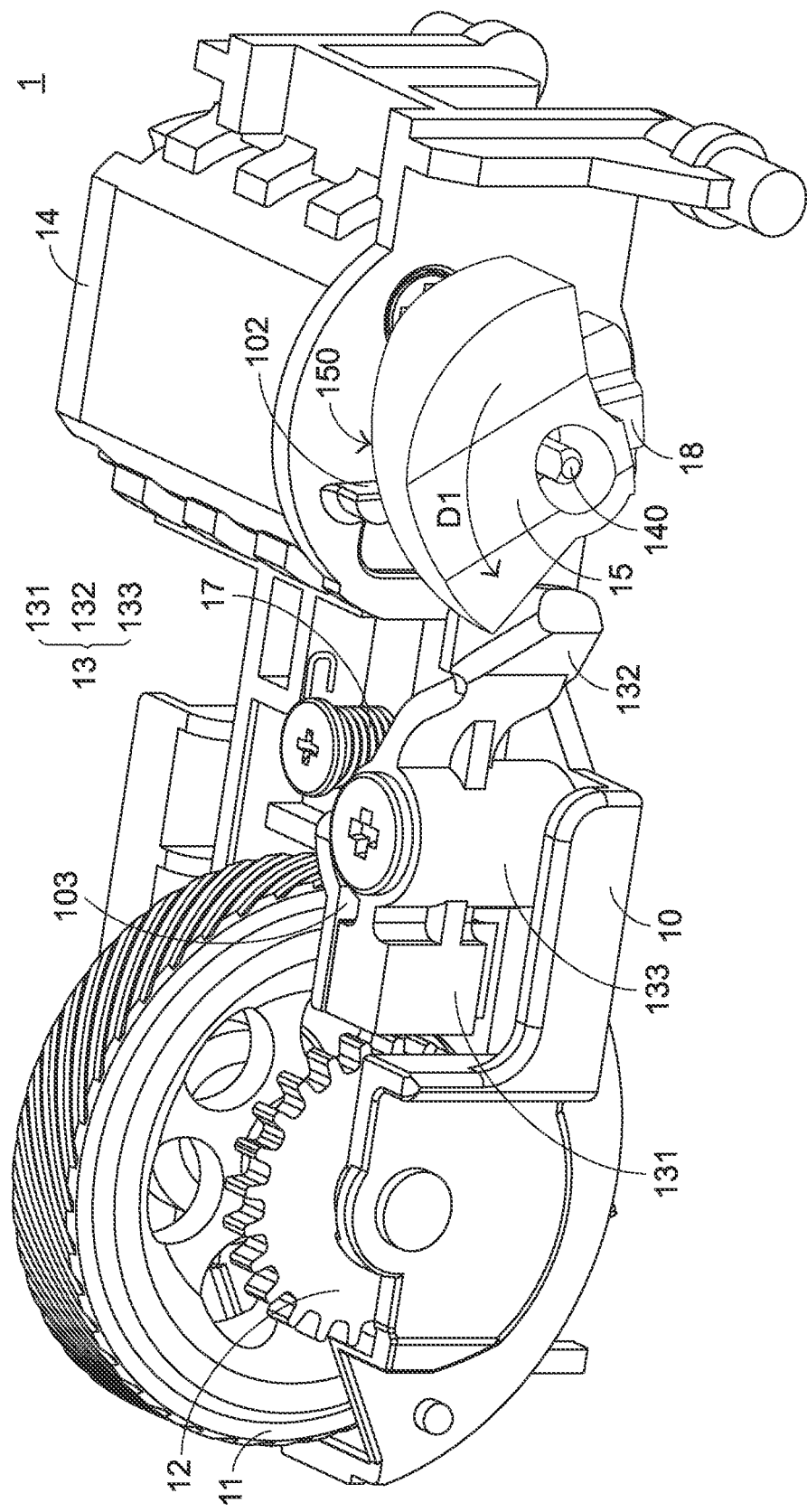
FIG. 2 is a schematic perspective view illustrating a roller module of the mouse device in a first operating mode.
Figure 3:
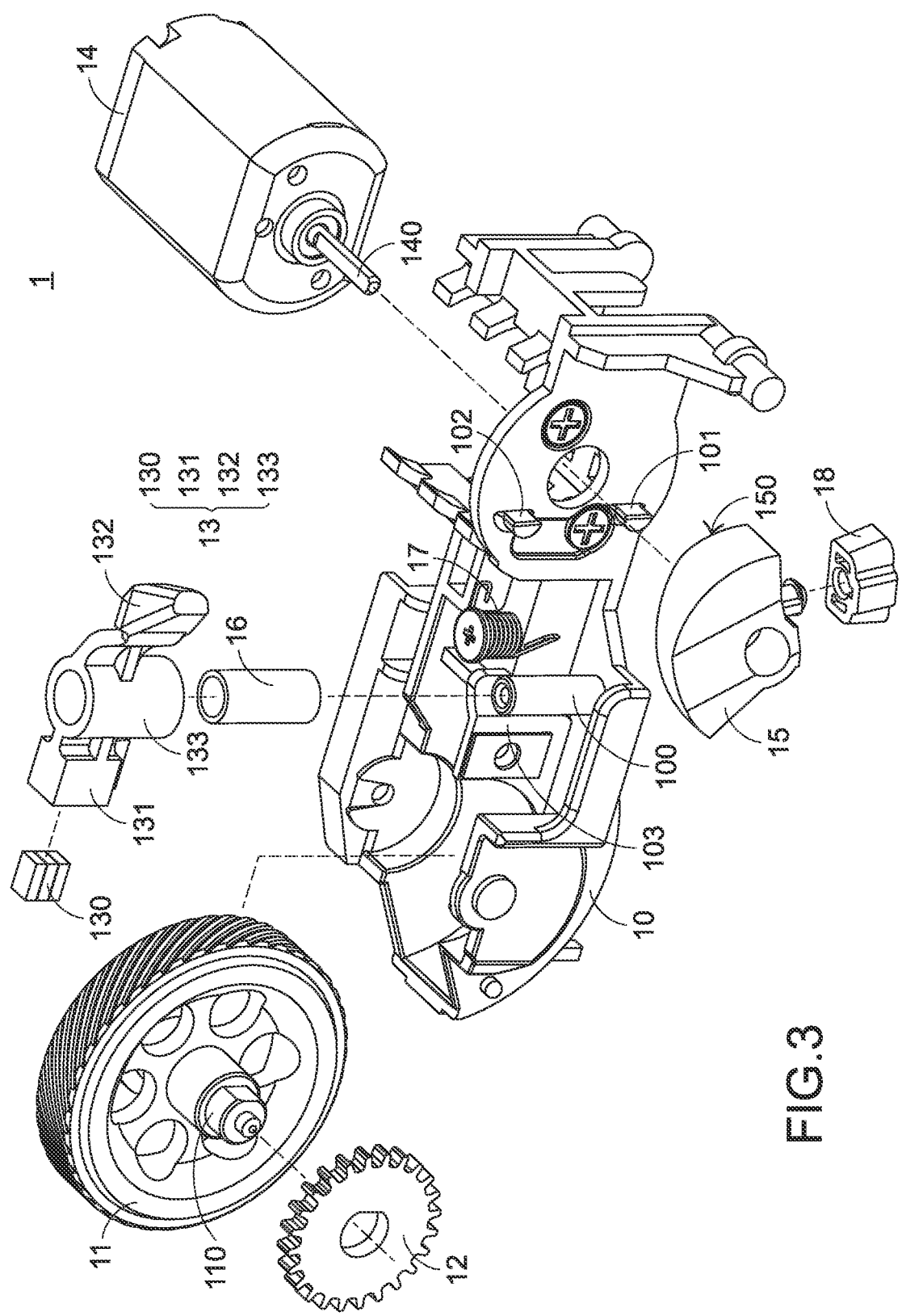
FIG. 3 is a schematic exploded view illustrating the components of the roller module as shown in FIG. 2.
Figure 4:
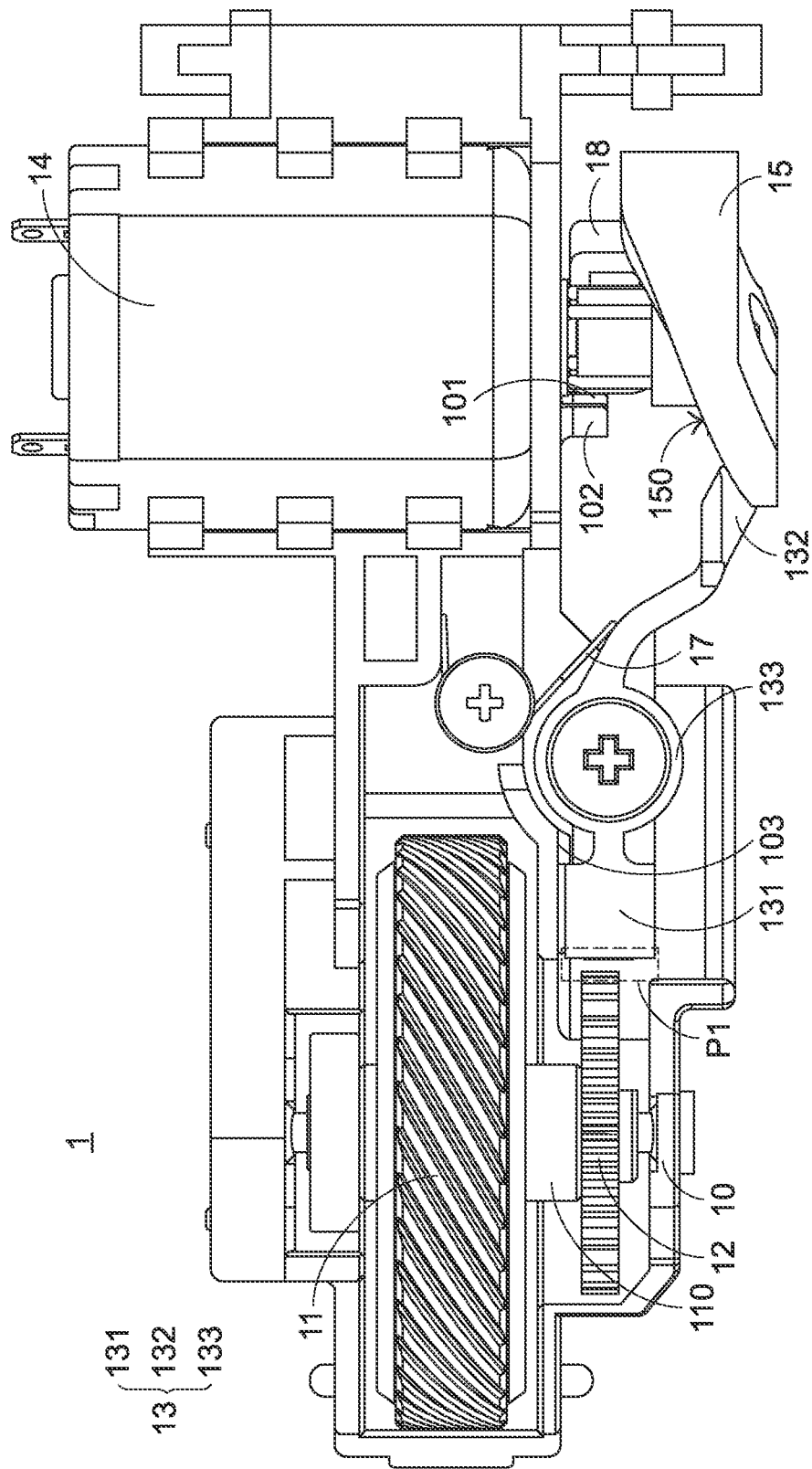
FIG. 4 is a schematic top view illustrating the components of the roller module as shown in FIG. 2.
Figure 5:
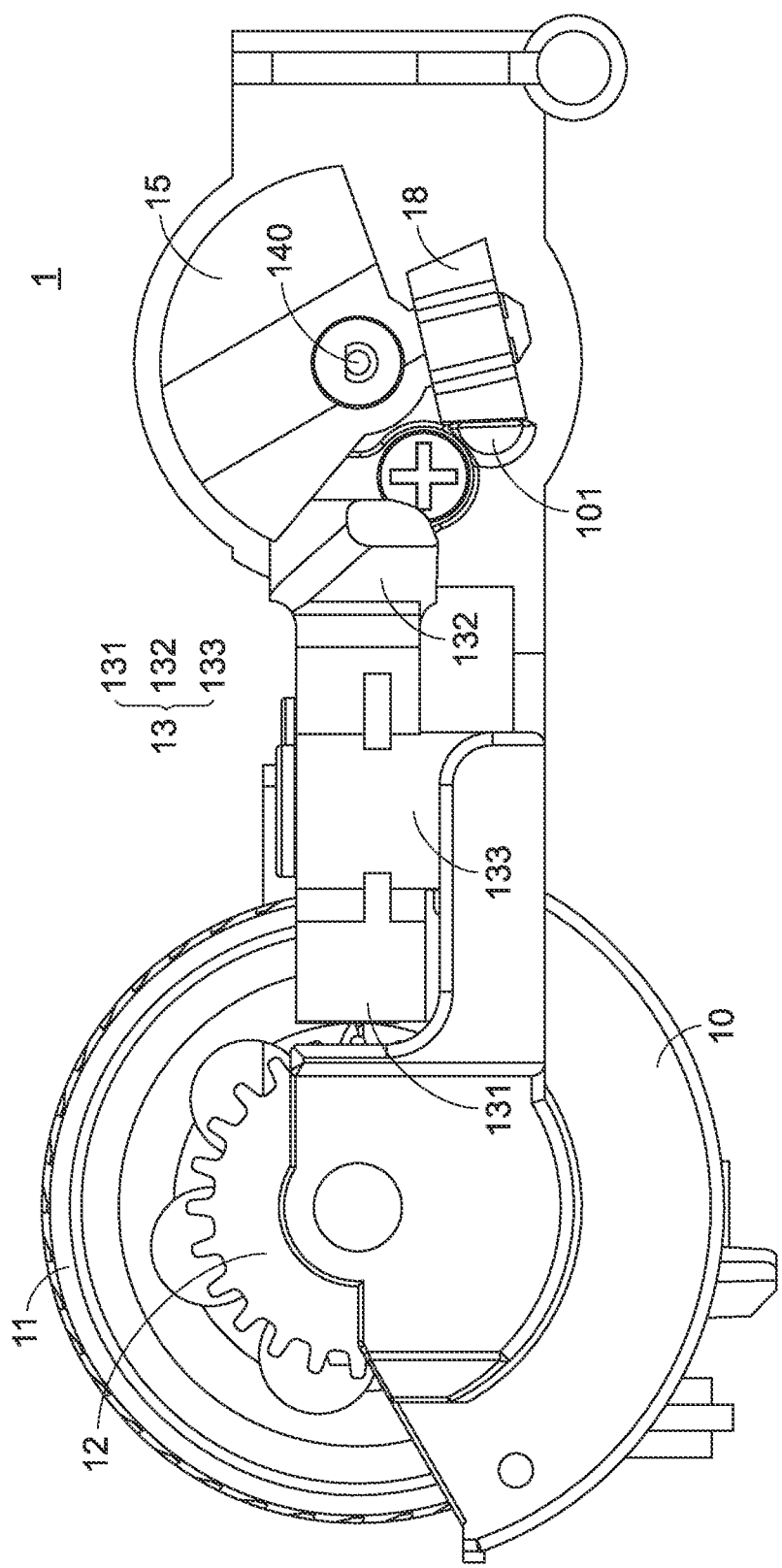
FIG. 5 is a schematic side view illustrating the components of the roller module as shown in FIG. 2.
Figure 6:
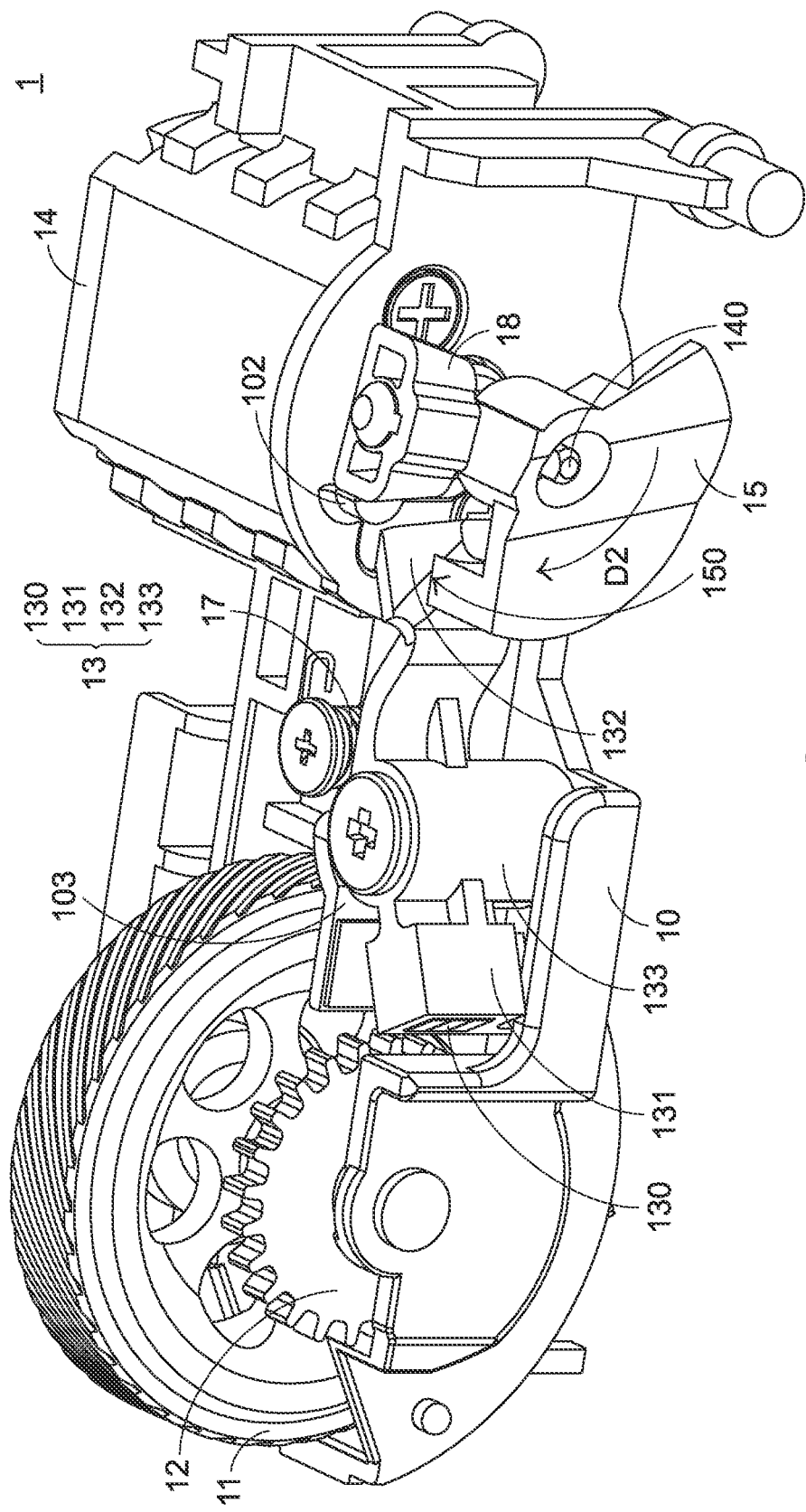
FIG. 6 is a schematic perspective view illustrating a roller module of the mouse device in a second operating mode.
Figure 7:
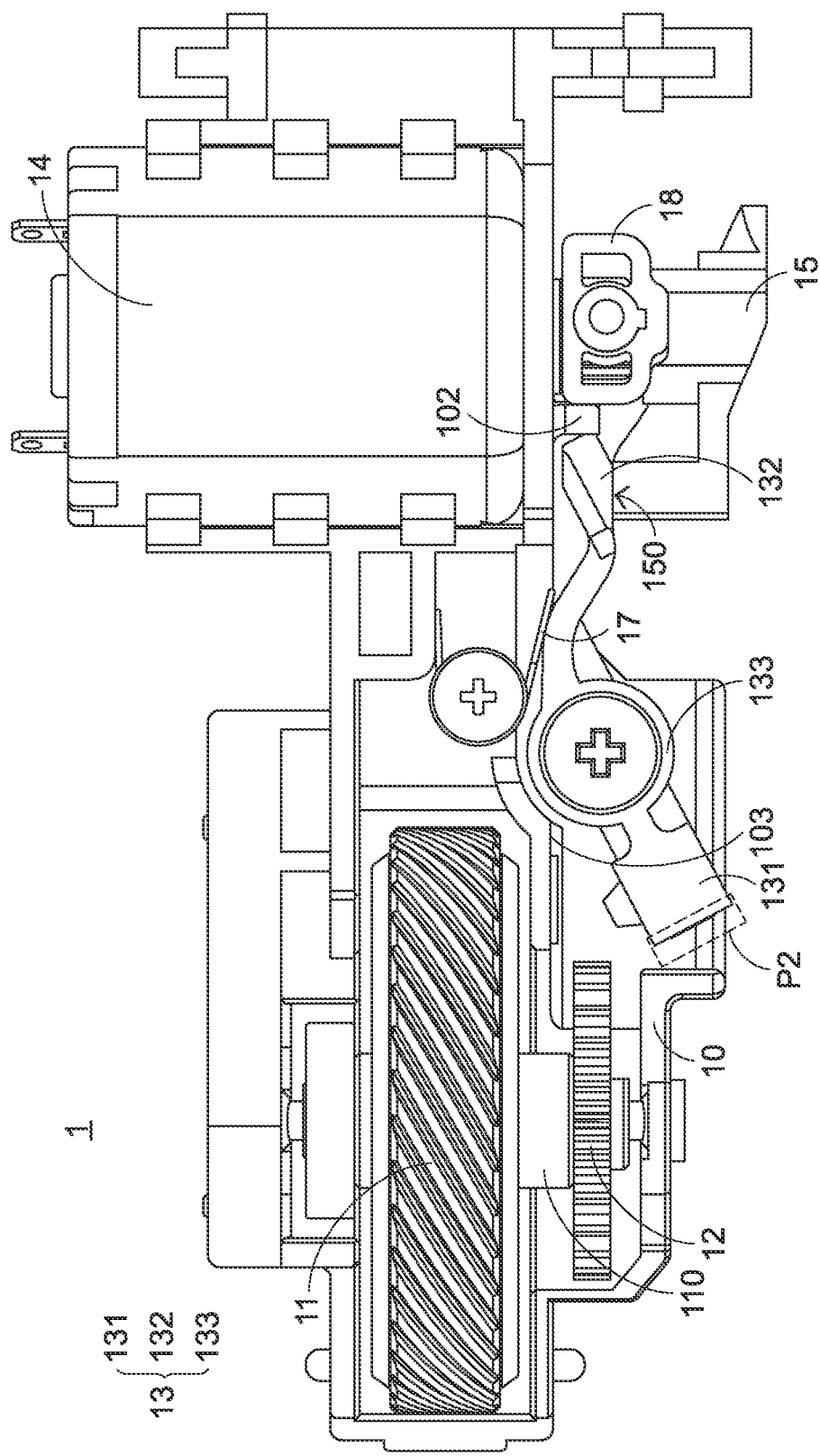
FIG. 7 is a schematic top view illustrating the components of the roller module as shown in FIG. 6.
Figure 8:
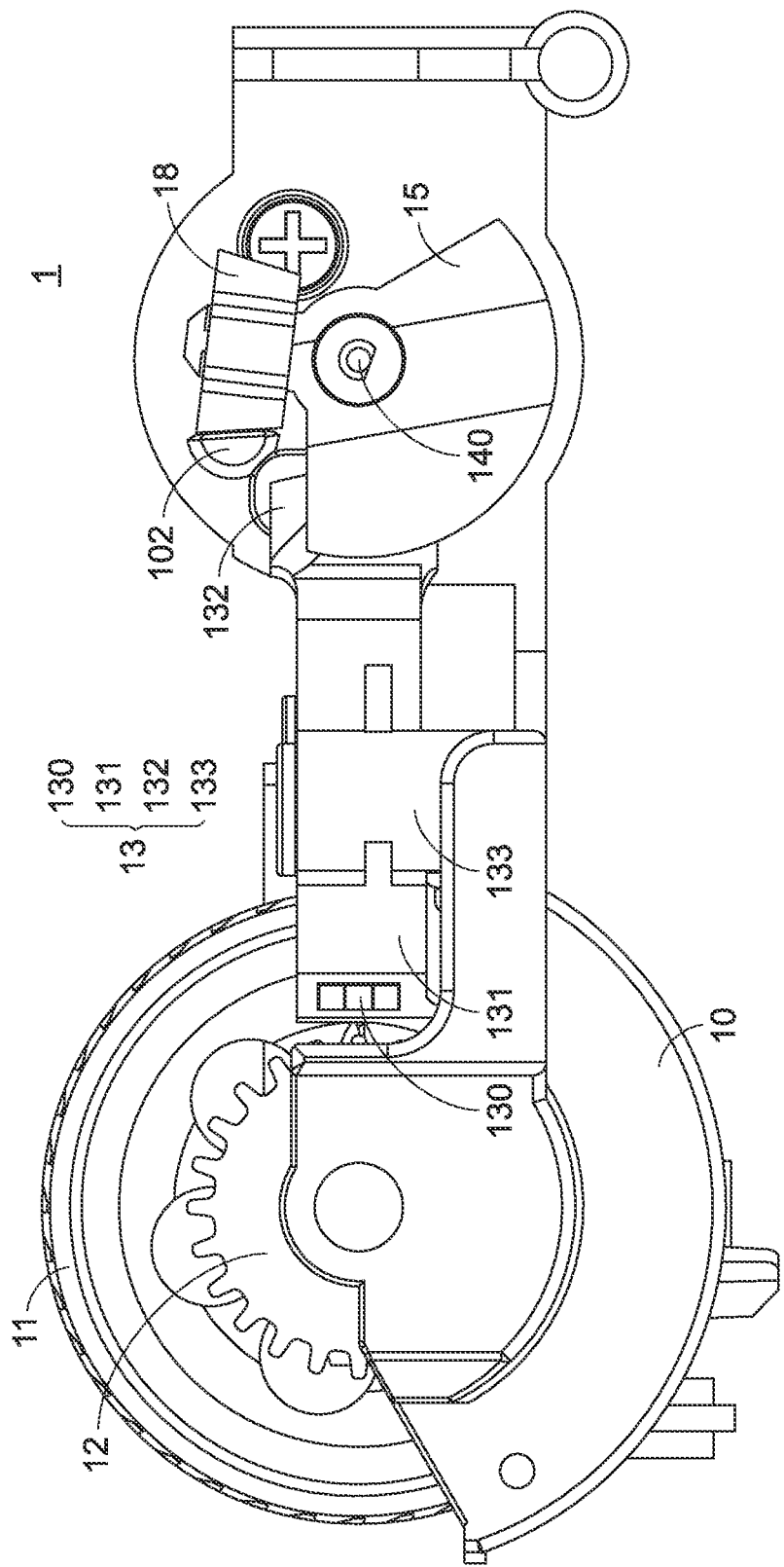
FIG. 8 is a schematic side view illustrating the components of the roller module as shown in FIG. 6.

Please refer to FIGS. 1 to 8. FIG. 1 is a schematic perspective view illustrating the appearance of a mouse device according to an embodiment of the present invention. FIG. 2 is a schematic perspective view illustrating a roller module of the mouse device in a first operating mode. FIG. 3 is a schematic exploded view illustrating the components of the roller module as shown in FIG. 2. FIG. 4 is a schematic top view illustrating the components of the roller module as shown in FIG. 2. FIG. 5 is a schematic side view illustrating the components of the roller module as shown in FIG. 2. FIG. 6 is a schematic perspective view illustrating a roller module of the mouse device in a second operating mode. FIG. 7 is a schematic top view illustrating the components of the roller module as shown in FIG. 6. FIG. 8 is a schematic side view illustrating the components of the roller module as shown in FIG. 6.

As shown in FIGS. 1 and 2, the mouse device 2 of this embodiment comprises a roller module 1 and a casing 3. A perforation 4 runs through a surface of the casing 3 of the mouse device 2. The perforation 4 is in communication with the inner space of the casing 3. The roller module 1 is installed within the inner space of the casing 3. A portion of a scroll wheel 11 of the roller module 1 is protruded out of the perforation 4 of the casing 3. Since the scroll wheel 11 is partially exposed outside the casing 3, the scroll wheel 11 can be manipulated by the user. When the mouse device 2 is operated by the user's hand or the mouse device 2 is held and moved, the computing device connected with the move device 2 is correspondingly controlled. For example, by moving the mouse device 2, a cursor shown on a display screen of the computing device is correspondingly moved. Moreover, by rotating the scroll wheel 11 of the mouse device 2, a vertical scroll bar on a window operation interface of the computing device is moved upwardly or downwardly. The examples and the operating principles of using the mouse device 2 to control the computing device are well known to those skilled in the art, and not redundantly described herein.

As shown in FIGS. 2 to 8, the roller module 1 comprises a base member 10, the scroll wheel 11, a magnetic conductor 12, a swingable arm 13, a driving motor 14 and an actuating element 15.

The scroll wheel 11 is installed on the base member 10. The scroll wheel 11 can be freely rotated relative to the base member 10. The magnetic conductor 12 is located beside the scroll wheel 11. When the scroll wheel 11 is rotated in response to an external force, the magnetic conductor 12 is correspondingly rotated with the scroll wheel 11. In other words, the scroll wheel 11 and the magnetic conductor 12 are rotated synchronously. The swingable arm 13 is installed on the base member 10. Moreover, the swingable arm 13 comprises a magnetic element 130. The swingable arm 13 can be swung relative to the magnetic conductor 12. While the swingable arm 13 is swung, the magnetic element 130 is correspondingly swung with the swingable arm 13. According to the relative position between the swingable arm 13 and the magnetic conductor 12, a magnetic attraction force between the magnetic element 130 and the magnetic conductor 12 can be generated or eliminated. Consequently, the operating mode of the roller module 1 can be switched between different operating modes. For example, the roller module 1 can be selectively operated in a stepped motion mode or a hyper-fast scrolling mode. The driving motor 14 is installed on the base member 10. The actuating element 15 is arranged between the driving motor 14 and the swingable arm 13. Moreover, the actuating element 15 has a curvy surface 150. In this embodiment, the driving motor 14 can drive the rotation of the actuating element 15. While the actuating element 15 is rotated, the curvy surface 150 of the actuating element 15 is contacted with the swingable arm 13. As the swingable arm 13 is moved along the curvy surface 150 of the actuating element 15, the relative position between the swingable arm 13 and the magnetic conductor 12 can be adjusted.

The other structures of the roller module 1 will be described in more details as follows.

Please also refer to FIGS. 2 to 8. In an embodiment, the scroll wheel 11 comprises a fixed shaft 110. The scroll wheel 11 is pivotally coupled to the base member 10 through the fixed shaft 110. Consequently, the scroll wheel 11 can be freely rotated relative to the base member 10 through the fixed shaft 110. The magnetic conductor 12 is sheathed around the fixed shaft 110 and located beside the scroll wheel 11. In other words, the magnetic conductor 12 is coaxially installed on the fixed shaft 110 of the scroll wheel 11. Consequently, the scroll wheel 11 and the magnetic conductor 12 can be rotated synchronously. An example of the magnetic conductor 12 includes but is not limited to a gear.

Please refer to FIGS. 2 to 8 again. In an embodiment, the driving motor 14 comprises a driving shaft 140. The actuating element 15 is sheathed around the driving shaft 140 of the driving motor 14. After the driving motor 14 is enabled, the driving shaft 140 is rotated to drive the rotation of the actuating element 15. In an embodiment, the actuating element 15 has a sector structure in appearance. The surface of the sector structure close to the driving motor 14 is the curvy surface 150. It is noted that the appearance and shape of the actuating element 15 is not restricted. Moreover, an example of the driving motor 14 includes but is not limited to a stepping motor.

In an embodiment, the fixed shaft 110 of the scroll wheel 11 and the driving shaft 140 of the driving motor 14 are in parallel with each other. That is, the extending direction of the fixed shaft 110 and the extending direction of the driving shaft 140 are in parallel with each other. Due to this structural design, the driving motor 14 is installed on the base member 10 in a horizontal manner. Since the occupied space of the driving motor 14 in the inner space of the casing 3 (see FIG. 1) of the mouse device 2 is reduced, this design is helpful to the slimness of the mouse device 2.

Please refer to FIGS. 2 to 8 again. In an embodiment, the swingable arm 13 further comprises a swinging part 131, a push part 132 and a pivotal part 133. The pivotal part 133 is connected between the swinging part 131 and the push part 132. The swingable arm 13 is pivotally coupled to the base member 10 through the pivotal part 133. The magnetic element 130 is installed in (or installed on) the swinging part 131. In addition, the magnetic attraction force between the magnetic element 130 and the magnetic conductor 12 is generated or eliminated according to the relative position between the swinging part 131 of the swingable arm 13 and the magnetic conductor 12. For example, when the swinging part 131 of the swingable arm 13 is swung to the position aligned with the magnetic conductor 12, the magnetic element 130 is arranged between the swinging part 131 and the magnetic conductor 12. Consequently, the magnetic attraction force between the magnetic element 130 and the magnetic conductor 12 is generated. Under this circumstance, the rotation of the scroll wheel 11 may result in a non-contact magnetic-floating stepped feel. Moreover, while the actuating element 15 is driven to rotate by the driving motor 14, the curvy surface 150 of the actuating element 15 is contacted with the push part 132 of the swingable arm 13. As the push part 132 of the swingable arm 13 is moved along the curvy surface 150 of the actuating element 15, the swingable arm 13 is swung to another position. Preferably but not exclusively, the magnetic element 130 is embedded in a surface of the swinging part 131 facing the magnetic conductor 12.

Please refer to FIGS. 2 to 8 again. In an embodiment, the base member 10 comprises a bearing 100. The bearing 100 is arranged between the magnetic conductor 12 and the actuating element 15. The swingable arm 13 is pivotally coupled to the bearing 100 of the base member 10 through the pivotal part 133. Consequently, the swingable arm 13 can be rotated and swung by using the bearing 100 as the fulcrum.

Please refer to FIGS. 2 to 8 again. In an embodiment, the roller module 1 further comprises a bearing sleeve 16. The bearing sleeve 16 is sheathed around the bearing 100 of the base member 10. When the swingable arm 13 is pivotally coupled to the bearing 100 of the base member 10 through the pivotal part 133, the bearing sleeve 16 is arranged between the bearing 100 and the pivotal part 133. While the actuating element 15 is driven to rotate by the driving motor 14 and the swingable arm 13 is correspondingly swung, the arrangement of the bearing sleeve 16 can prevent from the direct contact between the pivotal part 133 of the swingable arm 13 and the bearing 100 of the base member 10. Consequently, the pivotal part 133 of the swingable arm 13 and the bearing 100 of the base member 10 will not rub against each other. Due to this structural design, the use life of the swingable arm 13 is largely extended, the swingable arm 13 is swung more smoothly, and the friction noise is reduced.

Please refer to FIGS. 2 to 8 again. In an embodiment, the roller module 1 further comprises an elastic element 17. A first end of the elastic element 17 is contacted with the push part 132 of the swingable arm 13. A second end of the elastic element 17 is contacted with the base member 10. While the actuating element 15 is driven to rotate by the driving motor 14 and the swingable arm 13 is correspondingly swung, the elastic restoring force generated by the elastic element 17 can facilitate the swinging action of the swingable arm 13. Consequently, the swingable arm 13 can be smoothly swung to the target position. Preferably but not exclusively, the elastic element 17 is a torsion spring.

Please refer to FIGS. 2 to 8 again. In an embodiment, the roller module 1 further comprises a noise reduction element 18. Moreover, the base member 10 further comprises a first protrusion stopper 101 and a second protrusion stopper 102. The noise reduction element 18 is connected with the actuating element 15. The first protrusion stopper 101 and the second protrusion stopper 102 are opposed to each other. In addition, the first protrusion stopper 101 and the second protrusion stopper 102 are arranged between the driving motor 14 and the actuating element 15. While the actuating element 15 is driven to rotate by the driving motor 14 and the swingable arm 13 is correspondingly swung, the noise reduction element 18 is correspondingly rotated. When the noise reduction element 18 is contacted with the first protrusion stopper 101 or the second protrusion stopper 102, the actuating element 15 is positioned and not moved. In an embodiment, the noise reduction element 18 is made of a soft material. When the noise reduction element 18 is contacted with the first protrusion stopper 101 or the second protrusion stopper 102, almost no sound is generated. Consequently, while the actuating element 15 is driven to rotate by the driving motor 14 and the swingable arm 13 is correspondingly swung, the generated sound is effectively reduced.

The operations of the roller module 1 will be described in more details as follows.

In the situation of FIGS. 2, 4 and 5, the roller module 1 is operated in a stepped motion mode. In the situations of FIGS. 6, 7 and 8, the roller module 1 is operated in a hyper-fast scrolling mode. In order to switch the operating mode of the roller module 1 from the stepped motion mode to the hyper-fast scrolling mode, the user has to enable the driving motor 14 to drive the rotation of the actuating element 15 in a first direction D1. When the actuating element 15 is rotated in the first direction D1, the curvy surface 150 of the actuating element 15 is contacted with the push part 132 of the swingable arm 13, and the push part 132 of the swingable arm 13 is moved along the curvy surface 150 of the actuating element 15. Consequently, the swingable arm 13 is swung in a counterclockwise direction, and the swinging part 131 of the swingable arm 13 is correspondingly swung from a first position P1 to a second position P2. Moreover, while the push part 132 of the swingable arm 13 is moved along the curvy surface 150 of the actuating element 15, the elastic element 17 is compressed by the push part 132 of the swingable arm 13. As the push part 132 of the swingable arm 13 is moved along the curvy surface 150 of the actuating element 15 and the noise reduction element 18 is moved with the actuating element 15, the noise reduction element 18 is moved from the position contacted with the first protrusion stopper 101 to the position contacted with the second protrusion stopper 102.

When the swinging part 131 of the swingable arm 13 is located at the second position P2, the magnetic element 130 in the swinging part 131 is located away from the magnetic conductor 12. When the magnetic element 130 is located at the second position P2, the magnetic conductor 12 is completely departed from the sensing range of the magnetic element 130. Consequently, the magnetic attraction force between the magnetic element 130 and the magnetic conductor 12 is eliminated. Under this circumstance, the operating mode of the roller module 1 is switched from the stepped motion mode to the hyper-fast scrolling mode. When the roller module 1 is operated in the hyper-fast scrolling mode, the magnetic conductor 12 is not affected by the resistance corresponding to any magnetic attraction force. Consequently, the rotation of the scroll wheel 11 will not result in the stepped motion feel, and the scroll wheel 11 can be rotated at a fast speed.

In order to switch the operating mode of the roller module 1 from the hyper-fast scrolling mode (i.e., in the situations of FIGS. 6, 7 and 8) to the stepped motion mode (i.e., in the situation of FIGS. 2, 4 and 5), the user has to enable the driving motor 14 to drive the rotation of the actuating element 15 in a second direction D2. The second direction D2 is reverse to first direction D1. When the actuating element 15 is rotated in the second direction D2, the push part 132 of the swingable arm 13 is pushed in response to an elastic restoring force of the elastic element 17, and the push part 132 of the swingable arm 13 is moved along the curvy surface 150 of the actuating element 15. Consequently, the swingable arm 13 is swung in a clockwise direction, and the swinging part 131 of the swingable arm 13 is correspondingly swung from the second position P2 to the first position P1. As the push part 132 of the swingable arm 13 is moved along the curvy surface 150 of the actuating element 15 and the noise reduction element 18 is moved with the actuating element 15, the noise reduction element 18 is moved to from the position contacted with the second protrusion stopper 102 to the position contacted with the first protrusion stopper 101. Moreover, when the noise reduction element 18 is contacted with the first protrusion stopper 101, the curvy surface 150 of the actuating element 15 is detached from the push part 132 of the swingable arm 13.

When the swinging part 131 of the swingable arm 13 is located at the first position P1, the magnetic element 130 in the swinging part 131 and the magnetic conductor 12 are aligned with each other. When the magnetic element 130 is located at the first position P1, the magnetic conductor 12 is within the sensing range of the magnetic element 130. Consequently, the magnetic attraction force between the magnetic element 130 and the magnetic conductor 12 is generated. Under this circumstance, the operating mode of the roller module 1 is switched from the hyper-fast scrolling mode to the stepped motion mode. When the roller module 1 is operated in the stepped motion mode, the magnetic conductor 12 is affected by the resistance corresponding to the magnetic attraction force because the magnetic conductor 12 and the scroll wheel 11 are coaxially arranged. Consequently, the rotation of the scroll wheel 11 will result in the stepped motion feel. In case that the magnetic conductor 12 is a gear, plural tooth structures are formed on the outer surface of the gear. While the scroll wheel 11 is rotated, the magnetic attraction force between the rotated tooth structures of the gear and the magnetic element 130 is alternately changed between peaks and troughs. Consequently, the rotation of the scroll wheel 11 will result in the clear stepped motion feel.

Furthermore, in the situation of FIGS. 2, 4 and 5, the roller module 1 is operated in the stepped motion mode, the elastic restoring force generated by the elastic element 17 is applied to the push part 132 of the swingable arm 13 (see FIG. 4). In response to the elastic restoring force, the swinging part 131 of the swingable arm 13 is in close contact with a stopping plate 103, which is protruded from the base member 10. Consequently, the swinging part 131 of the swingable arm 13 can be positioned at the first position P1, which is close to the magnetic conductor 12. In the situations of FIGS. 6, 7 and 8, the roller module 1 is operated in the hyper-fast scrolling mode. Under this circumstance, the curvy surface 150 of the actuating element 15 is contacted with the push part 132 of the swingable arm 13. Moreover, as the noise reduction element 18 is moved with the actuating element 15, the noise reduction element 18 is contacted with the first protrusion stopper 101. Consequently, the swinging part 131 of the swingable arm 13 can be positioned at the second position P2, which is away from magnetic conductor 12.

From the above descriptions, the present invention provides the mouse device. In the roller module, the driving motor drives the rotation of the actuating element. While the actuating element is rotated, the curvy surface of the actuating element is contacted with the swingable arm. Consequently, the swingable arm is moved along the curvy surface of the actuating element, and the swingable arm is swung to a selected position relative to the magnetic conductor. According to the relative position between the swingable arm and the magnetic conductor, a magnetic attraction force between the magnetic element and the magnetic conductor can be generated or eliminated. Consequently, the operating mode of the roller module can be switched between the stepped motion mode and the hyper-fast scrolling mode. Due to this structural design, the magnetic element can be moved to a first position where the magnetic conductor is within the sensing range of the magnetic element or moved to a second position where the magnetic conductor is completely departed from the sensing range of the magnetic element. Consequently, the user can clear sense the operating feel corresponding to the stepped motion mode or the hyper-fast scrolling mode. Due to the arrangement of the noise reduction element and the bearing sleeve, the process of switching the operating mode of the roller module can be smoothly done while reducing the noise.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mouse device comprising a roller module, the roller module comprising:
    a base member;
    a scroll wheel installed on the base member;
    a magnetic conductor located beside the scroll wheel, wherein when the scroll wheel is rotated, the magnetic conductor is correspondingly rotated;
    a swingable arm installed on the base member, wherein the swingable arm comprises a magnetic element, and the swingable arm is swingable relative to the magnetic conductor, wherein when the swingable arm is swung to a first position, the magnetic element is aligned with the magnetic conductor, so that a magnetic attraction force between the magnetic element and the magnetic conductor is generated;
    a driving motor installed on the base member; and
    an actuating element arranged between the driving motor and the swingable arm, and having a curvy surface, wherein while the driving motor drives the actuating element to rotate in a first direction, the curvy surface of the actuating element is contacted with the swingable arm, so that the swingable arm is moved along the curvy surface of the actuating element and swung from a first position to a second position, wherein when the swingable arm is swung to the second position, the magnetic attraction force between the magnetic element and the magnetic conductor is eliminated.

2. The mouse device according to claim 1, wherein while the driving motor drives the actuating element to rotate in a second direction opposite to the first direction, the swingable arm is moved along the curvy surface of the actuating element and swung from the second position to the first position, wherein when the swingable arm is swung to the first position, the swingable arm is detached from the curvy surface of the actuating element.

3. The mouse device according to claim 2, wherein the roller module further comprises a noise reduction element, and the base member further comprises a first protrusion stopper and a second protrusion stopper, wherein the noise reduction element is connected with the actuating element, the first protrusion stopper and the second protrusion stopper are opposed to each other, and the first protrusion stopper and the second protrusion stopper are arranged between the driving motor and the actuating element, wherein while the driving motor drives the actuating element to rotate in the first direction, the noise reduction element is correspondingly rotated, and the noise reduction element is contacted with the first protrusion stopper, so that the actuating element is positioned at the first position, wherein while the driving motor drives the actuating element to rotate in the second direction, the noise reduction element is correspondingly rotated, and the noise reduction element is contacted with the second protrusion stopper, so that the actuating element is positioned at the second position.

4. The mouse device according to claim 1, wherein the scroll wheel comprises a fixed shaft, and the driving motor comprises a driving shaft, wherein the scroll wheel is pivotally coupled to the base member through the fixed shaft, the magnetic conductor is sheathed around the fixed shaft and located beside the scroll wheel, the actuating element is sheathed around the driving shaft of the driving motor, and an extending direction of the fixed shaft and an extending direction of the driving shaft are in parallel with each other.

5. The mouse device according to claim 1, wherein the swingable arm comprises:
    a swinging part, wherein the magnetic element is installed in or installed on the swinging part, wherein when the swingable arm is swung to the first position, the swinging part is aligned with the magnetic conductor, and the magnetic element is arranged between the swinging part and the magnetic conductor;
    a push part, wherein while the driving motor drives the actuating element to rotate in the first direction, the curvy surface of the actuating element is contacted with the push part; and
    a pivotal part connected between the swinging part and the push part, wherein the swingable arm is pivotally coupled to the base member through the pivotal part.

6. The mouse device according to claim 5, wherein the base member comprises a bearing, wherein the bearing is arranged between the magnetic conductor and the actuating element, and the swingable arm is pivotally coupled to the bearing through the pivotal part.

7. The mouse device according to claim 6, wherein the roller module further comprises a bearing sleeve, wherein the bearing sleeve is sheathed around the bearing of the base member, and the bearing sleeve is arranged between the bearing and the pivotal part of the swingable arm.

8. The mouse device according to claim 1, wherein the roller module further comprises an elastic element, wherein a first end of the elastic element is contacted with the swingable arm, and a second end of the elastic element is contacted with the base member.

9. The mouse device according to claim 1, wherein the magnetic conductor is a gear.

10. The mouse device according to claim 1, wherein the mouse device further comprises a casing, wherein the casing has a perforation, the roller module is installed within the casing, and a portion of the roller module is exposed outside the casing through the perforation.

* * * * *